United States Patent
Yun

(10) Patent No.: US 8,054,009 B2
(45) Date of Patent: Nov. 8, 2011

(54) LAMP DRIVING DEVICE AND LIQUID CRYSTAL DISPLAY DEVICE HAVING THE SAME

(75) Inventor: Chang Sun Yun, Gwangsan-gu (KR)

(73) Assignee: LG Innotek Co., Ltd., Seoul (KR)

( * ) Notice: Subject to any disclaimer, the term of this patent is extended or adjusted under 35 U.S.C. 154(b) by 138 days.

(21) Appl. No.: 11/913,304

(22) PCT Filed: May 10, 2007

(86) PCT No.: PCT/KR2007/002318
§ 371 (c)(1),
(2), (4) Date: Oct. 31, 2007

(87) PCT Pub. No.: WO2007/129875
PCT Pub. Date: Nov. 15, 2007

(65) Prior Publication Data
US 2010/0014019 A1 Jan. 21, 2010

(30) Foreign Application Priority Data
May 10, 2006 (KR) .................. 10-2006-0041906

(51) Int. Cl.
H05B 37/00 (2006.01)
H05B 41/24 (2006.01)
(52) U.S. Cl. ..................... 315/312; 315/277
(58) Field of Classification Search .......... 315/312, 315/277, 278, 291, 307, DIG. 5, DIG. 7
See application file for complete search history.

(56) References Cited

U.S. PATENT DOCUMENTS

| 6,943,506 | B2 | 9/2005 | Moon |
| 7,095,180 | B2 * | 8/2006 | Emslie et al. ................ 315/161 |
| 7,205,724 | B2 * | 4/2007 | Ahn et al. ................ 315/209 R |
| 7,427,977 | B2 * | 9/2008 | Park et al. .................. 345/102 |
| 2004/0100438 | A1 | 5/2004 | Lee et al. |
| 2004/0245944 | A1 | 12/2004 | Lee et al. |
| 2005/0128377 | A1 | 6/2005 | Park et al. |
| 2005/0280492 | A1 * | 12/2005 | Kohno ....................... 336/208 |
| 2006/0001386 | A1 | 1/2006 | Kim et al. |
| 2006/0043909 | A1 * | 3/2006 | Hwang et al. ............. 315/276 |
| 2006/0091819 | A1 * | 5/2006 | Li et al. .................... 315/209 R |
| 2006/0091821 | A1 * | 5/2006 | Li et al. .................... 315/209 R |

FOREIGN PATENT DOCUMENTS
KR 10-2005-0060232 A 6/2005

OTHER PUBLICATIONS

Kim, S.K. et al., "A Low-Cost High-Efficiency CCFL Inverter With New Capacitive Sensing and Control", *IEEE Transactions on Power Electronics*, Sep. 2006, pp. 1444-1451, vol. 21, No. 5, IEEE.
Supplementary European Search Report dated Feb. 15, 2011 in European Application No. 07746471.7, filed May 10, 2007.

* cited by examiner

Primary Examiner — Douglas W Owens
Assistant Examiner — Minh D A
(74) Attorney, Agent, or Firm — Saliwanchik, Lloyd & Eisenschenk

(57) ABSTRACT

Embodiment relate to a lamp driving device and a liquid crystal display device having the same. The embodiments include a plurality of lamps having first and second electrodes, an inverter substrate supplying a high voltage alternating current to at least one of the first and second electrodes of the lamps, a plurality of capacitors connected to the first and second electrodes of the lamps, and a board capacitor connected to at least one of the capacitors.

18 Claims, 3 Drawing Sheets

[Fig. 1]
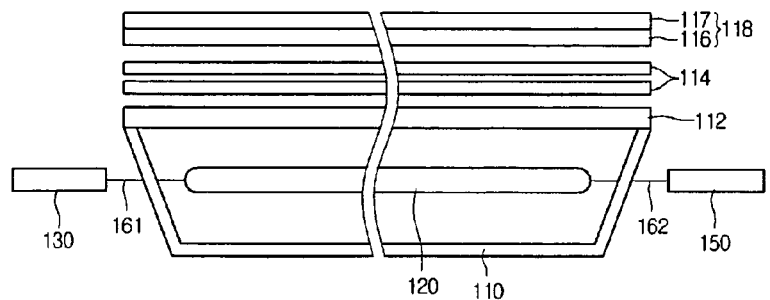
[Fig. 2]
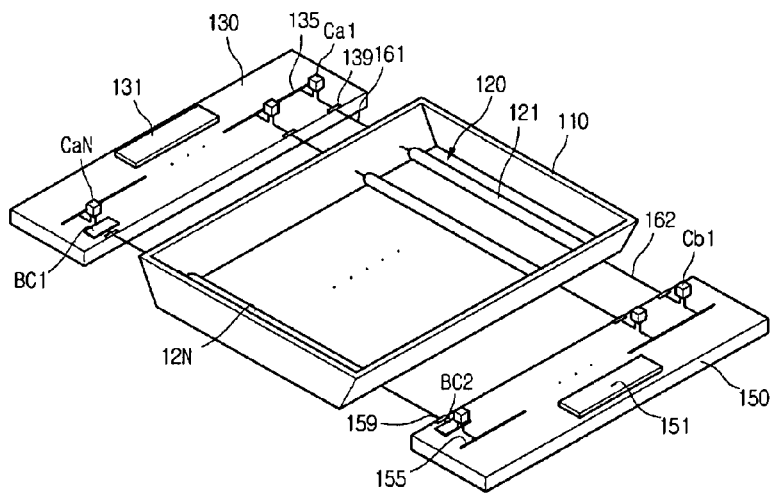
[Fig. 3]
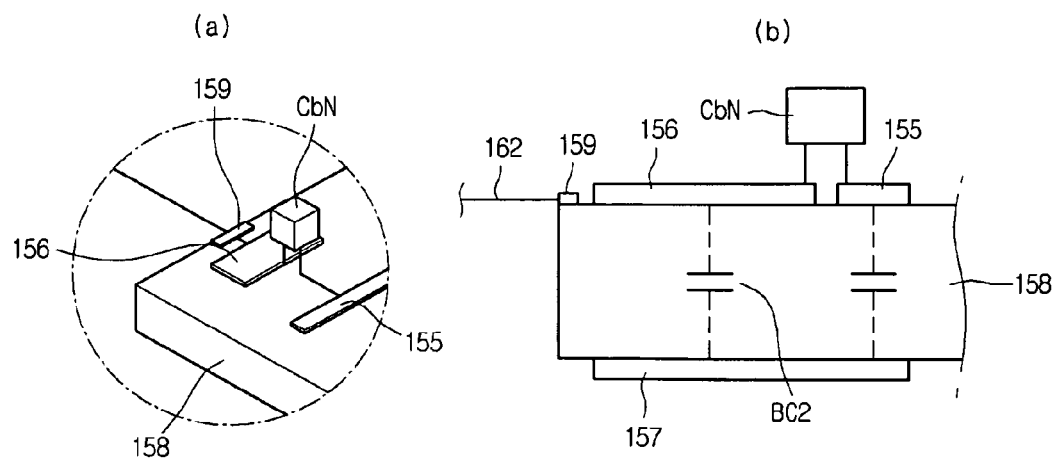

[Fig. 4]
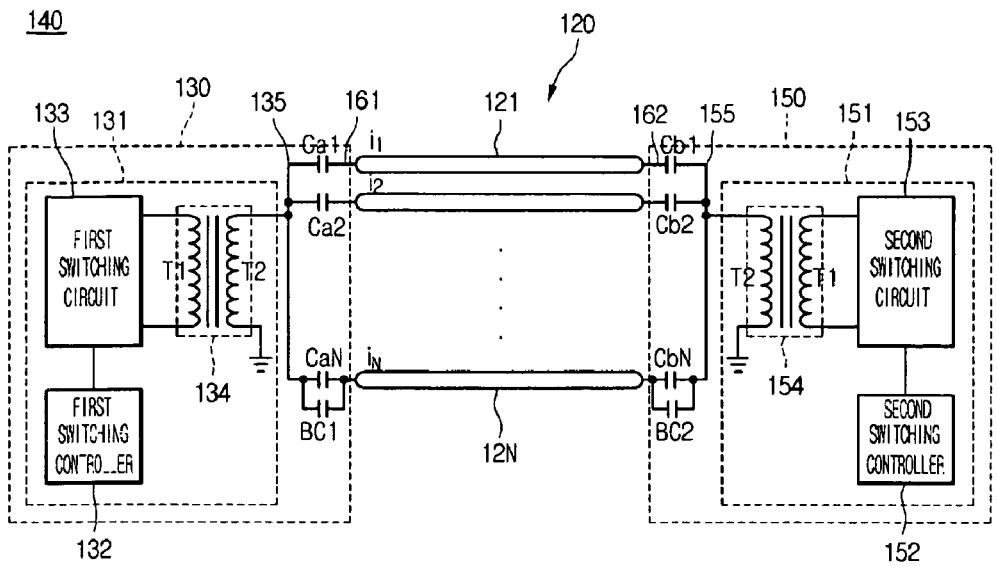
[Fig. 5]
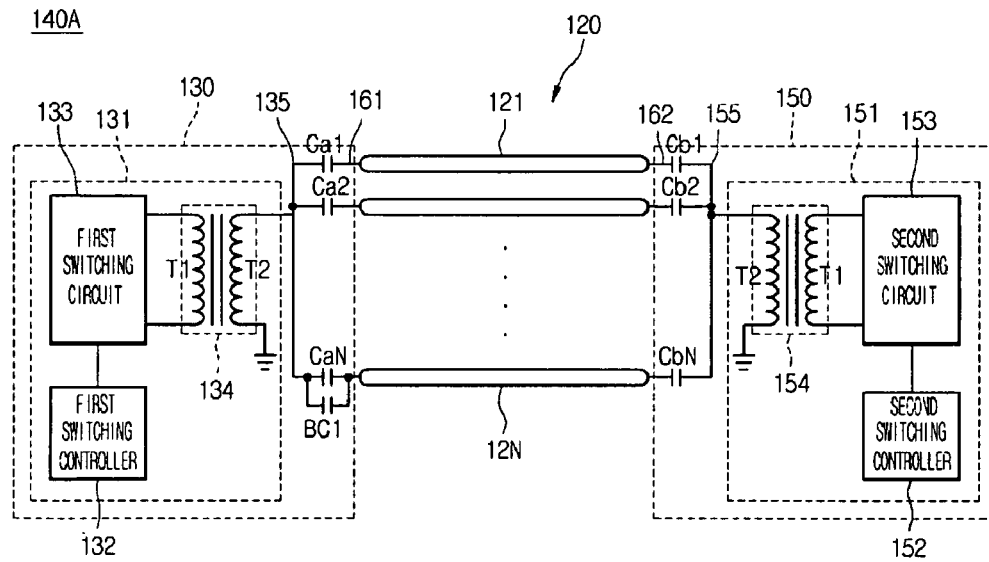

[Fig. 6]
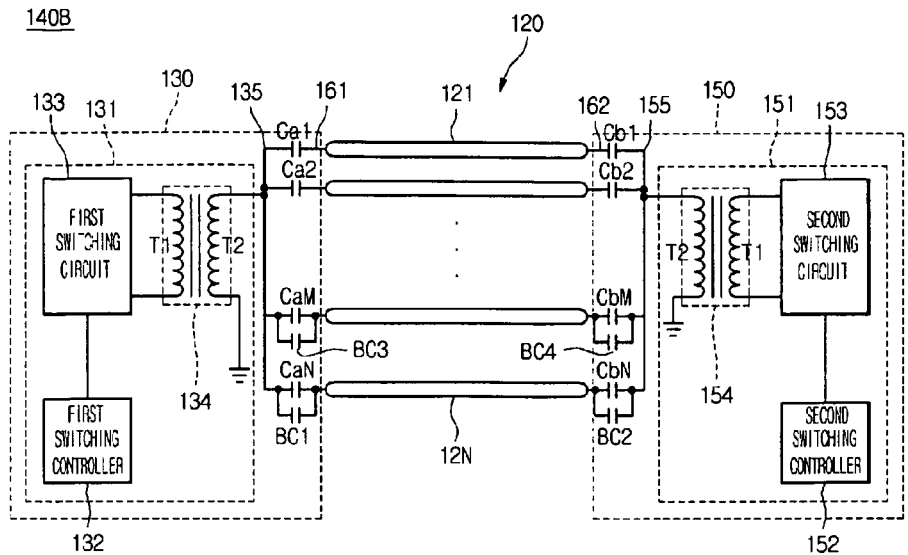
[Fig. 7]
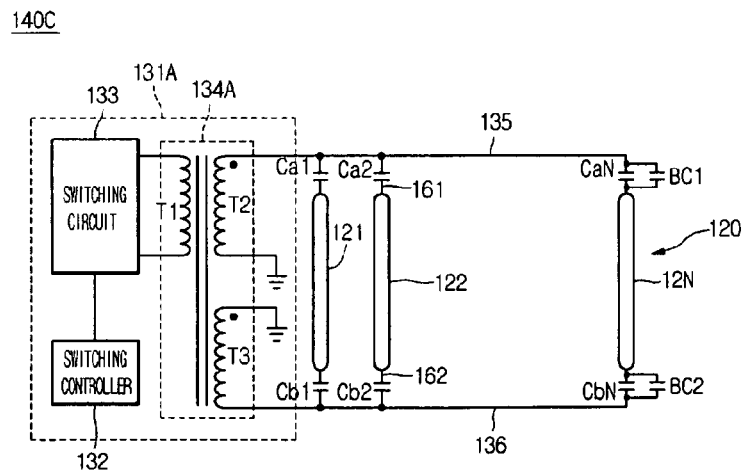
[Fig. 8]
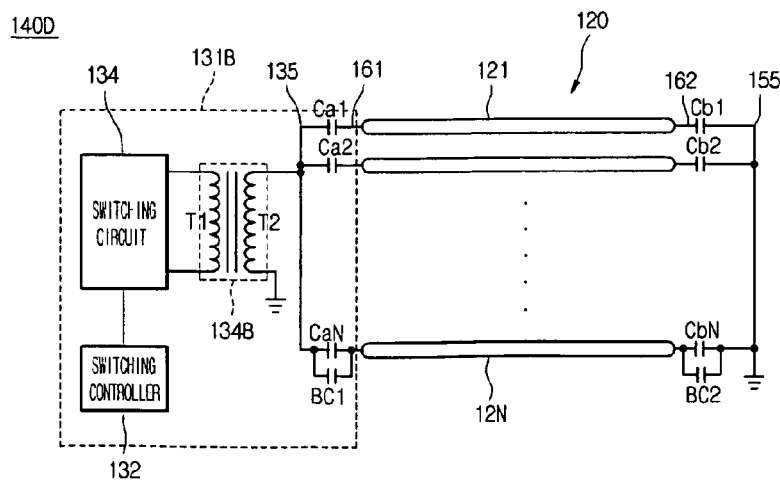

LAMP DRIVING DEVICE AND LIQUID CRYSTAL DISPLAY DEVICE HAVING THE SAME

CROSS-REFERENCE TO RELATED APPLICATION

This application is the U.S. national stage application of International Patent Application No. PCT/KR2007/002318, filed May 10, 2007, the disclosure of which is hereby incorporated by reference in its entirety.

TECHNICAL FIELD

Embodiments relate to a lamp driving device and a liquid crystal display device having the same.

BACKGROUND ART

Generally, a liquid crystal display (LCD) device gradually expands its application area thanks to its characteristics of lightweight, a slim profile, and low power consumption. With this trend, the LCD is used for office automation apparatus and audio/video apparatus.

The LCD device displays a desired image on a screen by controlling a light transmittance and an image signals applied to a plurality of switching devices arranged in a matrix type.

Since the LCD device is not a self-emission type display device, the LCD device requires a light source such as a backlight. A cold cathode fluorescent lamp (CCFL) is used as the light source used in the backlight.

The CCFL uses electron emission phenomenon caused by applying a strong electric field on a surface of a cold cathode, and it is suitable for realizing an LCD device with low heat generation, high brightness, long lifetime, full color, etc. The CCFL is classified into a light guide type, a direct light type, a reflective plate type, and so forth, and an appropriate typed one is employed depending on an LCD device. Ne, Ar, Hg, etc is used as a gas filled inside the CCFL.

As a lamp driving method used in the LCD device, two methods are being widely used, of which one is a method in which one lamp is driven by one transformer, and the other is a method in which a plurality of lamps are driven by one transformer.

When using a plurality of lamps, the temperature of the lamp increases as the operational time of the lamp increases. In this case, temperature gradients of lamps disposed at an upper portion are different from those disposed at a lower portion, which leads to temperature difference among the lamps. Accordingly, an impedance of the lamp changes so that the magnitude of current flowing through each of the lamps becomes different. That is, as the temperature of the lamp increases, gases filled inside the lamps actively move. This causes the impedance of the lamp to be lowered, and the current flowing into the lamps to be increased.

Consequently, a difference among the currents flowing through the lamps occurs inevitably, that is, there is current offset, causing the brightness of light emitted from the entire lamps to be non-uniform.

DISCLOSURE OF INVENTION

Technical Problem

An embodiment provides a lamp driving device for compensating for current offset among lamps, and a liquid crystal display (LCD) device having the lamp driving device.

An embodiment provides a lamp driving device that can increase current flowing into a corresponding lamp by connecting a board capacitor to a high voltage capacitor coupled to at least one electrode of at least one lamp, and an LCD device having the lamp driving device.

Technical Solution

An embodiment provides a lamp driving device comprising: a plurality of lamps having first and second electrode; a first inverter substrate supplying a current having a first phase to the first electrode of the lamps; a plurality of first capacitors connected to the first electrodes of the lamps; and a first board capacitor connected to at least one of the first capacitors.

An embodiment provides a lamp driving device comprising: a plurality of lamps having first and second electrodes; an inverter substrate supplying a high voltage alternating current to at least one of the first and second electrode of the lamps; a plurality of capacitors connected to the first and second electrode of the lamps; and a board capacitor connected to at least one of capacitors.

An embodiment provides a liquid crystal display device comprising: a plurality of lamps; a bottom cover having the lamps; a plurality of capacitors connected to both electrode of the lamps in the bottom cover; an inverter substrate including a board capacitor connected to at least one of the capacitors, and supplying an alternating current signal to at least one electrode of the lamps; at least one optical sheet disposed over the bottom cover; and a liquid crystal panel disposed over the optical sheet.

ADVANTAGEOUS EFFECTS

According to a lamp driving device and an LCD device of embodiments, there is an advantageous effect of compensating for current offset among respective lamps using a board capacitor.

In addition, it is possible to maintain the brightness of the lamps uniformly even when the lamps operate for a long time.

Since the board capacitor is formed on an inverter board, there is another advantageous effect that an extra capacitor is not required.

BRIEF DESCRIPTION OF THE DRAWINGS

FIG. 1 is a sectional view of a liquid crystal display (LCD) device according to an embodiment;

FIG. 2 is a perspective view schematically illustrating first and second inverter substrates according to an embodiment;

FIGS. 3A and 3B are a partial perspective view and a schematic view illustrating the constitution of a second capacitor and a board capacitor on an inverter substrate according to an embodiment;

FIG. 4 is a first circuit diagram of a lamp driving device according to an embodiment;

FIG. 5 is a second circuit diagram of a lamp driving device according to an embodiment;

FIG. 6 is a third circuit diagram of a lamp driving device according to an embodiment;

FIG. 7 is a fourth circuit diagram of a lamp driving device according to an embodiment; and FIG. 8 is a fifth circuit diagram of a lamp driving device according to an embodiment.

MODE FOR THE INVENTION

Reference will now be made in detail to the preferred embodiments of the present invention, examples of which are illustrated in the accompanying drawings.

FIG. 1 is a sectional view schematically illustrating a liquid crystal display (LCD) device 100 according to an embodiment.

Referring to FIG. 1, the LCD device 100 includes a bottom cover 110, a diffusion sheet 112, a prism sheet 114, a liquid crystal panel 118, a lamp 120, a first inverter substrate 130, and a second inverter substrate 150.

The bottom cover 110 may be formed in the shape of a vessel using a material with good heatsink properties, e.g., aluminum or the like. A plurality of lamps 120 are disposed in the bottom cover 110, and the lamp 120 may be any one of a cold cathode fluorescent lamp (CCFL), an external electrode fluorescent lamp (EEFL), a hot cathode fluorescent lamp (HCFL) and an external & internal electrode fluorescent lamp (EIFL).

The lamp 120 includes a glass tube, inert gases, e.g., Ar and Ne, in the glass tube, and first and second electrodes 161 and 162 installed on both ends of the glass tube. The inert gases are filled inside the glass tube, and fluorescent material is coated on an inner wall of the glass tube.

Optical sheets, which are multi-stacked over the bottom cover 110, include the diffusion sheet 112 and the prism sheet 114. The liquid crystal panel 118 is disposed over the prism sheet 114.

The diffusion sheet 112 enables light emitted from the plurality of lamps 120 to propagate toward the liquid crystal panel 118, and to be incident onto the liquid crystal panel 118 in a wide range of angles. This diffusion sheet 112 employs a film composed of transparent resin of which both sides are coated with a light-diffusing member.

The prism sheet 114 serves a role in improving the efficiency of light emitted from the diffusion sheet 112 and irradiating the light onto the liquid crystal panel 118. This prism sheet 114 selectively includes a brightness enhancement film or the like.

The liquid crystal panel 118 is formed by injecting liquid crystals (not shown) between an upper substrate 117 and a lower substrate 116. Although not shown, color filters, a common electrode, a black matrix, etc are formed on the upper substrate 117. Likewise, although not shown, signal lines such as data lines and gate lines are formed on the lower substrate 116, and thin film transistors are formed at crossings of the data lines and the gate lines on the lower substrate 116 as well.

In addition, an upper polarization sheet (not shown) is attached on a top surface of the upper substrate 117 of the liquid crystal panel 118, and a lower polarization sheet (not shown) is attached on a backside of the lower substrate 116. The upper and lower polarization sheets play roles in expanding a viewing angle of an image displayed by liquid crystal cells in matrix form.

The bottom cover 110 prevents the leakage of visible light emitted from the plurality of lamps 120, and reflects the visible light propagating through side and rear surfaces of the plurality of lamps 120 toward the diffusion sheet 112 to thereby improve the light efficiency. A reflective sheet may be provided on a bottom surface of the bottom cover 110.

The plurality of lamps 120 are connected between the first and second inverter substrates 130 and 150 in parallel. The first electrode 161 of the lamp 120 is connected to the first inverter substrate 130, and the second electrode 162 of the lamp 120 is connected to the second inverter substrate 150.

The first inverter substrate 130 inverts a lamp-driving power supplied from the outside into an alternating current signal. In addition, the first inverter substrate 130 converts the converted alternating current signal into a high voltage alternating current having a first phase, and supplies the high voltage alternating current having the first phase to the first electrode 161 of each lamp 120.

The second inverter substrate 150 inverts a lamp-driving power supplied from the outside into an alternating current signal. In addition, the second inverter substrate 150 converts the converted alternating current signal into a high voltage alternating current having a second phase, and supplies the high voltage alternating current having the second phase to the second electrode 162 of each lamp 120. Herein, a phase difference between the first and second phases is 180°.

The bottom cover 110, the lamp 120, and the optical sheets 112 and 114 act as a backlight unit of the LCD device 100.

FIG. 2 is a perspective view schematically illustrating the first and second inverter substrates 130 and 150 according to an embodiment.

Referring to FIG. 2, the first inverter substrate 130 includes a first inverter 131, a plurality of first capacitors Ca1~CaN, a first board capacitor BC1, and a plurality of first connectors 139.

The first inverter 131 supplies the high voltage alternating current having the first phase to the first electrode 161 of each of the plurality of lamps 120 (i.e., 121~12N) via a first common line 135. Each of the plurality of first capacitors Ca1~CaN are connected between the first electrode 161 of each lamp 121~12N and the first common line 135 in series. The first capacitors Ca1~CaN as high voltage capacitors limit high voltage current supplied to each of the lamps 121~12N to make current balance be uniform. The first board capacitor BC1 is connected to at least one of the first capacitors (e.g., CaN) in parallel, and compensates for current offset from other lamps. The first board capacitor BC1 may be embodied on the first inverter substrate 130 singly or in a plurality. The first connector 139, which is an output terminal of the first inverter substrate 130, is connected to the first electrode 161 of each lamp 121~12N.

The second inverter substrate 150 includes a second inverter 151, a plurality of second capacitors Cb1~CbN, a second board capacitor BC2, and a plurality of second connectors 159.

The second inverter 151 supplies the high voltage alternating current having the second phase to the second electrode 162 of each of the plurality of lamps 120 (i.e., 121~12N) via a second common line 155. Each of the plurality of second capacitors Cb1~CbN are connected between the second electrode 162 of each lamp 121~12N and the second common line 155 in series. The second capacitors Cb1~CbN as high voltage capacitors limit high voltage current supplied to each of the lamps 121~12N to make current balance be uniform. The second board capacitor BC2 is connected to at least one of the second capacitors (e.g., CbN) in parallel. The second board capacitor BC2 may be embodied on the second inverter substrate 150 singly or in a plurality. The second connector 159, which is an output terminal of the second inverter substrate 150, is connected to the second electrode 162 of each lamp 121~12N.

Here, the magnitude of current flowing through each of the lamps 121~12N can be determined by the magnitude of total impedance given by capacitance of each of the first capacitors Ca1~CaN, capacitance of each of the second capacitors Cb1~CbN, and capacitance of each of the lamps 121~12N.

The first board capacitor BC1 is connected to the Nth capacitor CaN of the plurality of first capacitors Ca1~CaN (hereinafter, referred to as Nth-arranged first capacitor CaN) in parallel, and the second board capacitor BC2 is connected to the Nth capacitor CbN of the plurality of second capacitors Cb1~CbN (hereinafter, referred to as the Nth-arranged second capacitor CbN) in parallel, which makes it possible to finely increase current flowing through the Nth lamp 12N. Herein, the Nth lamp 12N may be disposed at a lower portion of the bottom cover 110, or may be a lamp in which current offset occurs compared to the other lamps.

The total capacitances of the Nth-arranged first and second capacitors CaN and CbN increase in virtue of the capacitances of the first and second board capacitors BC1 and BC2 so that the current flowing through the Nth lamp 12N can increase.

An example of the compensation for current offset will be illustrated below. When the lamps 121~12N operate, the convection phenomenon occurs inside the bottom cover 110 due to the temperature increase of the lamps 121~12N. Since the lamp at an upper portion of the bottom cover 110 (hereinafter, referred to as upper lamp) operates at a relatively higher temperature than the lamp at a lower portion of the bottom cover 110 (hereinafter, referred to as lower lamp), the impedance of the upper lamp is reduced so that the current flowing into the upper lamp increases consequently. At this point, the current offset occurs between the upper lamp and the lower lamp in the bottom cover 110, but this current offset can be compensated using the first and second board capacitors BC1 and BC2 connected to the lower lamp.

The capacitances of the board capacitors BC1 and BC2 are set to predetermined values enabling the current flowing through each of the lamps 121~12N to have the same magnitude. That is, each of the lamps 121~12N operates in advance for a predetermined time as it not being coupled to the board capacitor BC1 and BC2 at a designing stage of a product, and thereafter the current offset value of each of the lamps 121~12N is calculated. Resultantly, it is possible to determine a lamp (e.g., 12N) requiring the compensation for current offset, and capacitances of the first and second board capacitors BC1 and BC2.

In the embodiment, the board capacitor is connected to the first electrode 161 and/or second electrode 162 of the lamp (e.g., 12N) through which relatively small current flows due to external environments under normal operation conditions. Therefore, the current supplied to the corresponding lamp (e.g., 12N) can be increased to thereby compensate for the current offset among the respective lamps. Accordingly, it is possible to make the brightness of light generated from the lamps 120 in the backlight unit be uniform.

At an initial stage when a power source is connected, the current flows greater through the lamp 12N connected to the board capacitors BC1 and BC2 than the other lamps. However, after the lapse of a predetermined time, the magnitude of current flowing each of the lamps 121~12N is equal to one another because of temperature difference among the respective lamps 121~12N. Thus, the current supplied to the specific lamp 12N can be increased using the board capacitors BC1 and BC2 embodied on the inverter substrates 130 and 150 without additionally installing an extra capacitor.

An example of realizing the board capacitor is illustrated in FIGS. 3A and 3B below. FIGS. 3A and 3B are a partial perspective view and a schematic view illustrating the second capacitor according to an embodiment.

Referring to FIGS. 3A and 3B, the second board capacitor BC2 includes an upper pattern 156 formed on the second inverter substrate, a lower pattern 157 formed under the second inverter substrate, and a dielectric 158 formed between the upper and lower patterns 156 and 157. The upper pattern 156 is formed to have a predetermined size, and the lower pattern 157 facing the upper pattern 156 may be formed to have a greater size than the upper pattern 156. Here, the upper pattern 156 or the lower pattern 157 may be formed on an inner layer of the second inverter substrate. In addition, the second board capacitor may be configured in embedded type in case of constituting the second inverter substrate as a multi-layered structure.

The upper pattern 156 is connected to one end of the Nth-arranged second capacitor CbN, and the second common line 155 is connected to the other end of Nth-arranged second capacitor CbN.

The second inverter substrate, which is a dielectric substrate, is formed to a predetermined thickness such that it has a desired dielectric constant. The upper and lower patterns 156 and 157 may be variously sized depending on capacitance.

The capacitance of the second board capacitor BC2 can be determined by Eq. 1 below.

$$C = \varepsilon \frac{A}{d} \qquad [\text{Eq. 1}]$$

where symbols C, A, d and ∈ denote the capacitance of the second board capacitor BC2, the size of the upper pattern 156, the space between the upper and lower patterns 156 and 157, and a dielectric constant of the dielectric 158, respectively.

From Eq. 1, the capacitance C is proportional to the size A of the upper pattern 156. The space d between the upper and lower patterns 156 and 157 of the second board capacitor BC2 is a fixed value corresponding to the thickness of the second inverter substrate, and thus the capacitance C is mainly determined according to the size A of the upper pattern 156. Therefore, the size A of the upper pattern 156 can be adjusted depending upon the capacitance C of the second board capacitor BC2.

Since the first and second board capacitors BC1 and BC2 are respectively formed on the first and second inverter substrates 130 and 150 in the same manner, further description for the first board capacitor BC1 will be omitted herein.

The first and second board capacitors BC1 and BC2, and the Nth-arranged first and second capacitors CaN and CbN can increase the current flowing through the Nth lamp, which enables the current to uniformly flow through the plurality of lamps driven in parallel.

FIG. 4 is a first circuit diagram of a lamp driving device 140 having an inverter according to an embodiment.

Referring to FIG. 4, the lamp driving device 140 includes a first inverter 131, a plurality of first capacitors Ca1~CaN, a first board capacitor BC1, a plurality of lamps 120 (i.e., 121~12N), a second inverter 151, a plurality of second capacitors Cb1~CbN, and a second board capacitor BC2.

The first inverter 131 includes a first switching controller 132, a first switching circuit 133, and a first transformer 134. The first switching controller 132 controls the first switching circuit 133 in response to a control signal supplied to a system. The first switching circuit 133 converts a lamp driving power supplied from a power supply into an alternating current signal by the control signal, and outputs the converted alternating current signal to the first transformer 134. The first transformer 134 outputs a high voltage alternating current having a first phase that is induced in a second coil T2 by a turn ratio between a first coil T1 and the second coil T2, wherein the first coil T1 is connected to an output terminal of the first switching circuit 133 and the second coil T2 is connected to a first common line 135. The high voltage alternating current having the first phase of the first transformer 134 is supplied to a first electrode 161 of each of the lamps 121~12N through the plurality of first capacitors Ca1~CaN via the first common line 135.

At this point, current iN supplied to the first electrode 161 of the Nth lamp 12N is determined by the sum of capacitances of the Nth-arranged first capacitor CaN and the first board capacitor BC1.

The second inverter 151 includes a second switching controller 152, a second switching circuit 153, and a second transformer 154. The second switching controller 152 controls the second switching circuit 153 in response to a control signal supplied to the system. The second switching circuit 153 outputs a high voltage alternating current having a second phase that is induced in a second coil T2 by a turn ratio between a first coil T1 and the second coil T2, wherein the first coil T1 is connected to an output terminal of the second switching circuit 153 and the second coil T2 is connected to a second common line 155. The high voltage alternating current having the second phase of the second transformer 154 is supplied to a second electrode 162 of each of the lamps 121~12N through the plurality of second capacitors Cb1~CbN via the second common line 155.

At this point, current supplied to the second electrode 162 of the Nth lamp 12N is determined by the sum of capacitances of the Nth-arranged second capacitor CbN and the second board capacitor BC2.

Here, there is a phase difference of 180° between the first phase of the first transformer 134 and the second phase of the second transformer 154.

In the lamp driving device 140, the current supplied to the lamps except for the Nth lamp 12N is limited by the first and second capacitors, whereas the current supplied to the Nth lamp 12N is limited by the first and second board capacitors BC1 and BC2 as well as the Nth-arranged first and second capacitors CaN and CbN.

Herein, all of the pluralities of first and second capacitors Ca1~CaN and Cb1~CbN may have the same capacitance, or one or more may have higher or lower capacitance than the others. In addition, the first and second board capacitors BC1 and BC2 may be selectively connected to the first electrode 161 and/or second electrode 162 of one or more lamps in which current offset occur.

FIG. 5 is a second circuit diagram of a lamp driving device 140A according to an embodiment. Like reference numerals of the second circuit diagram in FIG. 5 denote like elements as illustrated in FIG. 4, and thus their description will be replaced by the aforementioned description of FIG. 4.

Referring to FIG. 5, the first board capacitor BC1 is formed to the first inverter substrate 130, but the second board capacitor BC2 in FIG. 4 is not formed to the second inverter substrate 150. That is, the lamp driving device 140A includes a first inverter 131, a plurality of first capacitors Ca1~CaN, a board capacitor BC1, a plurality of lamps 120 (i.e., 121~12N), a second inverter 151, and a plurality of second capacitors Cb1~CbN.

Herein, the first inverter substrate 130 can includes at least one of the board capacitors The current supplied to the first electrode 161 of the Nth lamp 12N among the plurality of the lamps 121~12N is determined by the sum of capacitances of the Nth-arranged first capacitor CaN and the board capacitor BC1.

In the lamp driving device 140A, the current supplied to the Nth lamp 12N is limited by the Nth-arranged first and second capacitors CaN and CbN, and the board capacitor BC1. That is, current flowing through a lamp can be adjusted by connecting the board capacitor to at least one of the capacitors in parallel that are connected to the first and second electrodes of the lamp.

FIG. 6 is a third circuit diagram of a lamp driving device 140B according to an embodiment. Like reference numerals of the third circuit diagram in FIG. 6 denote like elements as illustrated in FIG. 4, and thus their description will be replaced by the aforementioned description of FIG. 4.

Referring to FIG. 6, each of the inverter substrates 130, 150 of the lamp driving device 140B includes the plurality of the board capacitors as compared with the FIG. 4. That is, the lamp driving device 140B includes a first inverter 131, a plurality of first capacitors Ca1~CaN, a plurality of first board capacitors BC1 and BC3, a plurality of lamps 120 (i.e., 121~12N), the second inverter 151, a plurality of second capacitors Cb1~CbN, and a plurality of second board capacitors BC2 and BC4.

The plurality of fast board capacitors BC1 and BC3 are formed on the first inverter substrate 130, and the plurality of second board capacitors BC2 and BC4 are formed on the second inverter substrate 150.

In the lamp driving device 140B, the current supplied to the Nth lamp 12N is determined by the sum of capacitances of the Nth-arranged first and second capacitors CaN and CbN, and the first and second board capacitors BC1 and BC2. Likewise, the current supplied to the Mth lamp 12M is determined by the sum of capacitances of the Mth-arranged first and second capacitors CaM and CbM, and the first and second board capacitors BC3 and BC4.

Here, the board capacitors BC3 and BC4 connected to the Mth lamp 12M may have pattern sizes which are equal to or different from those of the board capacitors BC1 and BC2 connected to the Nth lamp 12N. For example, the Nth-arranged board capacitors BC1 and BC2 positioned at the lowermost portion of the bottom cover may be formed such that their upper patterns have relatively large sizes.

FIG. 7 is a fourth circuit diagram of a lamp driving device 140C according to an embodiment. Like reference numerals of the fourth circuit diagram in FIG. 7 denote like elements as illustrated in FIG. 4, and thus their description will be replaced by the aforementioned description of FIG. 4.

Referring to FIG. 7, the lamp driving device 140C is a difference of the major component in a inverter substrate and a transformer as compared with the FIG. 4

In the FIG. 7, the lamp driving device 140C includes an inverter substrate 131A formed singly, a plurality of first capacitors Ca1~CaN, a first board capacitor BC1, a plurality of lamps 120 (i.e., 121~12N), a plurality of second capacitors Cb1~CbN, and a second board capacitor BC2.

The inverter substrate 131A includes a switching controller 132, a switching circuit 133, and a transformer 134A.

The transformer 134A supplies a high voltage alternating current having a first phase that is induced in a second coil T2 by a turn ratio between a first coil T1 connected to an output terminal of the switching circuit 133 and the second coil T2 connected to the first common line 135. In addition, the transformer 134A supplies a high voltage alternating current having a second phase that is induced in a third coil T3 by a turn ratio between the first coil T1 and the third coil T3 connected to the second common line 136.

The high voltage alternating currents with first and second phases generated from the transformer 134A are supplied to the first and second electrodes 161 and 162 of the respective lamps 121~12N through the pluralities of first and second capacitors Ca1~CaN and Cb1~CbN via the first and second common lines 135 and 136. Herein, there is a phase difference of 180° between the first and second phases of the transformer 134A.

The second board capacitor BC2 may be formed on a separate capacitor substrate instead of the inverter substrate.

FIG. 8 is a fifth circuit diagram of a lamp driving device 140D according to an embodiment. Like reference numerals of the fifth circuit diagram in FIG. 8 denote like elements as illustrated in FIG. 4, and thus their description will be replaced by the aforementioned description of FIG. 4.

Referring to FIG. 8, the lamp driving device 140D is not formed the second inverter substrate as compared with FIG. 4, includes an inverter substrate 131B formed singly. That is, the lamp driving device 140D includes an inverter substrate 131B formed singly, a plurality of first capacitors Ca1~CaN, a first board capacitor BC1, a plurality of lamps 120 (i.e., 121~12N), a plurality of second capacitors Cb1~CbN, and a second board capacitor BC2.

The inverter substrate 131B includes a switching controller 132, a switching circuit 133, and a transformer 134B. The high voltage alternating current generated from the transformer 134B is supplied to the first electrode 161 of each of the lamps 121~12N through the plurality of first capacitors Ca1~CaN via the first common line 135.

The plurality of second capacitors Cb1~CbN are respectively connected to the second electrodes of the lamps 121~12N, and also connected to the grounded second common line 155.

The current flowing through the first and second electrodes 161 and 162 of the Nth lamp 12N among the plurality of lamps 121~12N is determined by the sum of capacitances of the Nth-arranged first and second capacitors CaN and CbN and the first and second board capacitors BC1 and BC2.

The second board capacitor BC2 may be formed on a separate capacitor substrate instead of the inverter substrate.

The board capacitors according to the embodiments may be formed on a separate capacitor substrate instead of the inverter substrate, and they can increase the current supplied to the lamp in which current offset occurs during the operation of each lamp.

INDUSTRIAL APPLICABILITY

In accordance with a lamp driving device and an LCD device according to the embodiments, it is possible to compensate for current offset among respective lamps using a board capacitor connected to a high voltage capacitor in parallel.

In addition, the brightness of lamps can be maintained uniformly even when the lamps operate for a long time.

Further, since the board capacitor is formed on an inverter substrate, it is unnecessary to form an extra capacitor.

Although the preferred embodiments of the present invention have been disclosed for illustrative purpose, those skilled in the art will appreciate that various modifications, additions and substitutions can be made without departing from the scope and spirit of the invention as defined in the accompanying claims.

The invention claimed is:

1. A lamp driving device comprising:
a plurality of lamps, each lamp having a first electrode and a second electrode;
a first substrate capable of supplying a current having a first phase to the first electrodes of the plurality of lamps;
a plurality of first capacitors connected in series with the first electrodes of the plurality of lamps, each first capacitor having one terminal connected to a corresponding first electrode of the plurality of lamps;
a first board capacitor formed of a portion of the first substrate and connected in parallel with at least one first capacitor of the plurality of first capacitors;
a second substrate capable of supplying a current having a second phase to the second electrodes of the plurality of lamps;
a plurality of second capacitors connected in series with the second electrodes of the plurality of lamps; and
a second board capacitor formed of a portion of the second substrate and connected in parallel with at least one second capacitor of the plurality of second capacitors,
wherein the first board capacitor is connected to the one terminal of the at least one first capacitor of the plurality of first capacitors and the corresponding first electrode of the plurality of lamps to which the one terminal is connected,
wherein the first board capacitor has a first capacitance by the configuration of upper and lower patterns of the first substrate and a dielectric between the upper and lower patterns of the first substrate, and
wherein the second board capacitor has a second capacitance by the configuration of upper and lower patterns of the second substrate and a dielectric between the upper and lower patterns of the second substrate.

2. The lamp driving device according to claim 1, wherein the lamp comprises one selected from the group consisting of a cold cathode fluorescent lamp (CCFL), an external electrode fluorescent lamp (EEFL), a hot cathode fluorescent lamp (HCFL) and an external & internal electrode fluorescent lamp (EIFL).

3. The lamp driving device according to claim 1, wherein the first capacitors of the plurality of first capacitors are respectively connected between a first common line formed on the first substrate and the first electrode of a corresponding lamp of the plurality of lamps, and
the second capacitors of the plurality of second capacitors are respectively connected between a second common line formed on the second substrate and the second electrode of a corresponding lamp of the plurality of lamps.

4. The lamp driving device according to claim 1, wherein the first substrate comprises:
a first switching control unit for outputting a first control signal;
a first switching circuit switched by the first control signal to convert a supplied power into a first alternating current signal; and
a first transformer capable of converting the first alternating current signal supplied by the first switching circuit into a first high voltage alternating current; and
wherein the second substrate comprises:
a second switching control unit for outputting a second control signal;
a second switching circuit switched by the second control signal to convert a supplied power into a second alternating current signal; and
a second transformer capable of converting the second alternating current signal supplied by the second switching circuit into a second high voltage alternating current,
wherein the first high voltage alternating current and the second high voltage alternating current have phases different from each other.

5. The lamp driving device according to claim 1, wherein the first substrate is further capable of supplying a current having the second phase to the second electrodes of the plurality of lamps.

6. The lamp driving device according to claim 5, wherein the first substrate comprises a transformer outputting the first phase and the second phase, the transformer comprising:
a first coil to which an alternating current is supplied;
a second coil in which a high voltage alternating current having the first phase is induced from the first coil; and
a third coil in which a high voltage alternating current having the second phase is induced from the first coil.

7. The lamp driving device according to claim 1, wherein the first board capacitor and the second board capacitor are electrically connected to the first and second electrodes of any one of the plurality of lamps, respectively.

8. The lamp driving device according to claim 1, wherein the first board capacitor is formed in single form.

9. The lamp driving device according to claim 8, wherein the second board capacitor is formed in single form.

10. The lamp driving device according to claim 1, wherein current supplied to any one of the lamps is controlled by the sum of capacitances of the first and second board capacitors and the first and second capacitors connected to the any one of the lamps.

11. The lamp driving device according to claim 1, wherein the configuration of upper and lower patterns of the first substrate forming the first board capacitor comprises:
 a first upper pattern of the first substrate being connected to the one terminal of the at least one first capacitor of the plurality of first capacitors and the corresponding first electrode of the plurality of lamps to which the one terminal is connected;
 a second upper pattern of the first substrate being connected to a second terminal of the at least one first capacitor of the plurality of first capacitors; and
 a first lower pattern of the first substrate extending from below at least a portion of the first upper pattern to below at least a portion of the second upper pattern.

12. A lamp driving device comprising:
 a plurality of lamps, each lamp having a first electrode and a second electrode;
 a substrate capable of supplying a high voltage alternating current to the first electrodes of the plurality of lamps, the second electrodes of the plurality of lamps, or the first electrodes and the second electrodes of the plurality of lamps;
 a plurality of first capacitors connected to the first electrodes of the plurality of lamps, respectively;
 a plurality of second capacitors connected to the second electrodes of the plurality of lamps, respectively;
 a first board capacitor connected to at least one of the plurality of first capacitors in parallel; and
 a second board capacitor connected to at least one of the plurality of second capacitors in parallel,
 wherein the first and second board capacitors are formed of the substrate having a dielectric
 wherein each of the first and second board capacitors comprises: an upper pattern of the substrate and a lower pattern corresponding to the upper pattern, wherein the dielectric is disposed between the upper and lower patterns of the substrate, wherein the at least one board capacitor has a capacitance so as to compensate for current offset occurring due to temperature difference among the lamps of the plurality of lamps.

13. The lamp driving device according to claim 12, wherein current supplied to any one of the lamps is controlled by the sum of capacitances of the first and second board capacitors and the first and second capacitors connected to the any one of the lamps.

14. The lamp driving device according to claim 12, wherein the upper pattern of the substrate for the first board capacitor comprises a first upper pattern connected to one terminal of the at least one of the plurality of first capacitors and a second upper pattern connected to an opposite terminal of the at least one of the plurality of first capacitors, wherein the lower pattern for the first board capacitor extends from below at least a portion of the first upper pattern to below at least a portion of the second upper pattern; and
 wherein the upper pattern of the substrate for the second board capacitor comprises a third upper pattern connected to one terminal of the at least one of the plurality of second capacitors and a fourth upper pattern connected to an opposite terminal of the at least one of the plurality of second capacitors, wherein the lower pattern for the second board capacitor extends from below at least a portion of the third upper pattern to below at least a portion of the fourth upper pattern.

15. A liquid crystal display device comprising:
 a plurality of lamps;
 a bottom cover for housing the lamps;
 a plurality of capacitors connected to electrodes of the lamps of the plurality of lamps in the bottom cover;
 a substrate including a board capacitor connected in parallel with at least one of the capacitors of the plurality of capacitors, and capable of supplying an alternating current signal to at least one of the electrodes of the lamps of the plurality of lamps, wherein the board capacitor is connected to the one terminal of the at least one of the capacitors of the plurality of capacitors, wherein the one terminal of the at least one of the capacitors connects the at least one of the capacitors to a corresponding electrode of the electrodes of the lamps in the bottom cover;
 at least one optical sheet disposed over the bottom cover; and
 a liquid crystal panel disposed over the optical sheet,
 wherein the substrate comprises: a first substrate capable of supplying a high voltage alternating current having a first phase to a first electrode of the electrodes of the lamp; and a second substrate capable of supplying a high voltage alternating current having a second phase to a second electrode of the electrodes of the lamps,
 wherein the board capacitor is provided as a first board capacitor having a first capacitance by the configuration of upper and lower patterns of the first substrate and a dielectric between the upper and lower patterns of the first substrate, and a second board capacitor having a second capacitance by the configuration of upper and lower patterns of the second substrate and a dielectric between the upper and lower patterns of the second substrate.

16. The liquid crystal display device according to claim 15, wherein current offset from lamps not connected to the board capacitor is compensated by the sum of capacitances of the board capacitor and the capacitor connected to the board capacitor.

17. The liquid crystal display device according to claim 15, wherein current supplied to any one of the lamps is controlled by the sum of capacitances of the first and second board capacitors and the first and second capacitors connected to the any one of the lamps.

18. The lamp driving device according to claim 15, wherein the configuration of upper and lower patterns of the first substrate forming the first board capacitor comprises:
 a first upper pattern of the first substrate being connected to the one terminal of the at least one of the capacitors of the plurality of capacitors and the corresponding electrode of the electrodes of the lamps to which the one terminal is connected;
 a second upper pattern of the first substrate being connected to a second terminal of the at least one of the capacitors of the plurality of capacitors; and
 a first lower pattern of the first substrate extending from below at least a portion of the first upper pattern to below at least a portion of the second upper pattern.

* * * * *